United States Patent [19]

Seven et al.

[11] Patent Number: 6,096,822
[45] Date of Patent: Aug. 1, 2000

[54] LOW MOLECULAR WEIGHT POLYESTER OR POLYAMIDE PIGMENT DISPERSING COMPOSITION AND COLOR CONCENTRATE FOR THE MANUFACTURE OF COLORED POLYMERS

[75] Inventors: Manfred K. Seven; Lawrence E. Coombs; Vincent Clarke, all of Morris County; Joseph Wrozina, Bergen County; Levente L. Koller, Sussex County; Charles F. Lences, Morris County, all of N.J.

[73] Assignee: AlliedSignal Inc.

[21] Appl. No.: 09/252,271

[22] Filed: Feb. 18, 1999

Related U.S. Application Data

[60] Provisional application No. 60/082,516, Apr. 21, 1998.

[51] Int. Cl.⁷ .......................... C08L 67/02; C08L 69/00; C08L 77/00
[52] U.S. Cl. ...................... 524/513; 524/500; 524/514; 524/537; 524/538; 524/539
[58] Field of Search .................................. 524/500, 513, 524/514, 537, 538, 539

[56] References Cited

U.S. PATENT DOCUMENTS

| | | | |
|---|---|---|---|
| 4,279,802 | 7/1981 | Laely et al. | 260/40 |
| 4,366,270 | 12/1982 | Riiter | 523/307 |
| 4,639,272 | 1/1987 | Ito et al. | 106/243 |
| 5,194,090 | 3/1993 | Tajiri et al. | 106/499 |
| 5,336,314 | 8/1994 | Lamers | 106/506 |

FOREIGN PATENT DOCUMENTS

| | | |
|---|---|---|
| 0 331 876 | 9/1989 | European Pat. Off. . |
| 820975 | 9/1959 | United Kingdom . |
| 1044378 | 4/1963 | United Kingdom . |
| 1 249 720 | 10/1971 | United Kingdom . |

*Primary Examiner*—Ana Woodward
*Attorney, Agent, or Firm*—Colleen D. Szuch

[57] ABSTRACT

The invention provides low molecular weight polyesters and polyamides useful for flushing wet pigments and manufacturing color concentrates. More specifically, the compositions of the invention are effective for flushing wet pigments, producing pigment dispersions and then producing colored polymers with the pigment dispersions.

27 Claims, No Drawings ically produced and it is necessary to flush these aqueous
LOW MOLECULAR WEIGHT POLYESTER OR POLYAMIDE PIGMENT DISPERSING COMPOSITION AND COLOR CONCENTRATE FOR THE MANUFACTURE OF COLORED POLYMERS This application claims the benefit of copending provisional application Ser. No. 60/082,516 filed Apr. 21, 1998.

BACKGROUND OF THE INVENTION

The present invention relates to low molecular weight polyesters and polyamides useful for dispersing pigments and for coloring polymers. More specifically, the compositions of the invention are effective for displacing water from aqueous pigment dispersions, producing pigment dispersions and then coloring host polymers with the pigment dispersions.

It is well known in the art to produce pigments. During the manufacture of pigments, an aqueous pigment dispersion is typically produced and it is necessary to flush these aqueous pigment dispersions to remove water therefrom. However, the removal of water by simply drying can result in an unwanted agglomeration of pigment particles. Therefore, in practice, only a portion of the water is removed, leaving a finely divided pigment in the form of a wet cake. It is known in the art to remove residual water from such wet cakes by flushing them with polymeric dispersing agents. The process of flushing prepares dispersions in which the pigments remain finely divided and in an intimate mixture with a pigment dispersing agent for further processing such as incorporation into polymeric compositions and inks. The process of flushing pigments is described in U.K. Patent 915,453.

It is also well known to color high melting point polymers. U.K. patent 1,044,378 teaches uniformly dispersing a pigment in a high melting point polymer by forming an intimate mixture of a pelletized or powdered pigment with a pelletized or powdered polymer compatible with the high melting point polymer but having a lower melting point than the high melting point polymer. The process involves heating and mixing to uniformly distribute the pigment in the low melting polymer, solidifying the mass, mixing the solid with a high melting point polymer and melting them together. Each of the high and low melting point polymers are of the same chemical type. U.S. Pat. No. 4,279,802 forms a concentrate of a pigment and a polyester, which concentrate is then used to color a linear polyester. U.S. Pat. No. 5,336,314 uses a polyester or acrylic polymer having phthalimide or naphthalimide groups as pigment dispersion vehicles and pigment presscake flushing agents for the preparation of coatings.

According to this invention, a pigment dispersion is formed by mixing a wet pigment presscake with a low molecular weight polyester or polyamide pigment dispersing agent. The mixture is coagulated and the aqueous phase is removed, typically by heating the composition, optionally in a vacuum. The pigment dispersed in the low molecular weight polymer can optionally be pulverized. The pulverized pigment/dispersing agent mixture can then be diluted with a polar host polymer such as polystyrene homopolymer, styrene copolymers, polycarbonates, polyesters, or polyamides to give high quality color concentrates for eventual manufacture into finished consumer parts and goods. The concentrates are very high quality pigment dispersions, achieving maximum coloration at minimum pigment concentration with efficient use of equipment and machinery. The pigment dispersing agent of the invention is a low melting temperature, low viscosity vehicle which acts as a receptor for the pigment and separates the water during the flushing process. Alternatively, the dispersing agent acts as a low viscosity fluid in the melt state which uniformly wets out the pigment and disperses it by the mechanical action of mixing equipment, such as a single or twin screw extruder. The coloring process is conventionally carried out by blending the flushed, dried and ground pigment containing the dispersing agent with a host polymer and extruding and pelletizing this blend. Satisfactory performance requires that the pigment dispersing agent of choice be compatible with the polymer with which it is subsequently mixed to efficiently disperse the pigments during the coloring process; have good dispersion of the pigment to obtain maximum tint or color intensity and homogeneous distribution of the pigment; and have good extrusion characteristics to produce flexible strands with good strength and pelletizing characteristics for maximum production efficiency and output rate.

It has now been found that by using a certain molar ratio of the dispersing agent precursors, the compatibility of the dispersing agent composition can be tailored to the host polymer. The characteristics of the dispersing agent, such as, melting point and viscosity can be made to fit specific host polymer processing characteristics. In this way, an class of polyester or polyamide dispersing agents with adjustable physical properties can be made compatible with a selected host polymer to suit a particular end use application.

DESCRIPTION OF THE INVENTION

The invention provides a composition comprising a) a mixture of at least one pigment, and at least one polyester or polyamide pigment dispersing agent, which pigment dispersing agent has a Brookfield viscosity of from about 2,000 cps to about 500,000 cps at 140° C., and a melting temperature of up to about 150° C.; and b) at least one host polymer selected from the group consisting of polyesters, polycarbonates, polyamides and styrenics; and wherein when the pigment dispersing agent is a polyester, the host polymer is not a polyester and wherein when the pigment dispersing agent is a polyamide, the host polymer is not a polyamide.

The invention also provides a method of forming a colored composition which comprises (a) contacting an aqueous pigment dispersion or an aqueous wet pigment cake with at least one polyester or polyamide pigment dispersing agent, which pigment dispersing agent has a Brookfield viscosity of from about 2,000 cps to about 500,000 cps at 140° C., and a melting temperature of up to about 150° C., under conditions sufficient to displace water from the aqueous pigment dispersion and form an intimate mixture of the pigment and the pigment dispersing agent;

(b) removing the displaced water;

(c) thereafter melt blending the mixture with at least one host polymer selected from the group consisting of polyesters, polycarbonates, polyamides and styrenics; and wherein when the pigment dispersing agent is a polyester, the host polymer is not a polyester and wherein when the pigment dispersing agent is a polyamide, the host polymer is not a polyamide.

The invention further provides a method of forming a colored polymer composition which comprises (a) mixing at least one pigment and at least one polyester or polyamide pigment dispersing agent and heating to at least the melting temperature of the pigment dispersing agent;
(b) cooling the resulting mixture from step (a) and preferably forming the mixture into pellets or granules;
(c) blending the cooled resulting mixture from step (b), which is preferably in the form of pellets or granules with at least one host polymer selected from the group consisting of polyesters, polycarbonates, polyamides and styrenics, wherein when the pigment dispersing agent is a polyester, the host polymer is not a polyester and wherein when the pigment dispersing agent is a polyamide, the host polymer is not a polyamide; and heating to at least the melting temperature of the host polymer to thereby form a colored polymer composition.

The invention still further provides a method of forming a colored polymer composition which comprises (a) mixing at least one pigment; at least one polyester or polyamide pigment dispersing agent; and at least one host polymer selected from the group consisting of polyesters, polycarbonates, polyamides and styrenics; wherein the melting temperature of the host polymer is at least about 10° C. higher than the melting temperature of the pigment dispersing agent and wherein when the pigment dispersing agent is a polyester, the host polymer is not a polyester and wherein when the pigment dispersing agent is a polyamide, the host polymer is not a polyamide;
(b) mixing and heating the resulting mixture from step (a) to at least the melting temperature of the pigment dispersing agent but below the melting temperature of the host polymer until the pigment and the pigment dispersing agent are intimately combined; and thereafter
(c) mixing and heating the resulting mixture from step (b) to at least the melting temperature of the host polymer to thereby form an intimately mixed, colored polymer composition.

Specifically, we have found that certain polyester and polyamide polymers which contain both an aromatic component and a flexible spacer component make them particularly well suited for use as pigment dispersing agents. Aromatic components mean a multifunctional organic aromatic compound. Suitable aromatic components include di- tri- or tetra-functional aromatic acids with one or more optional alcohol, amine, anhydride, ester or acid halide moieties. A flexible spacer means a difunctional or trifunctional aliphatic organic compound having at least four carbon atoms and preferably having from about six to about twelve carbon atoms. The functional groups on the flexible spacer are chosen based on those of the aromatic component so as to effectively form amide or ester linkages. These choices would be apparent to one well skilled in the art.

The pigment dispersing agent according to the invention is a low molecular weight polyester or polyamide which has a Brookfield viscosity of from about 2,000 cps to about 500,000 cps at 140° C. Preferably the pigment dispersing agent has a Brookfield viscosity of from about 3,000 cps to about 250,000 cps at 140° C. and more preferably a Brookfield viscosity of from about 2,000 cps to about 500,000 cps at 140° C. For the pigment flushing use according to the invention, the dispersing agent should additionally have a melting temperature of up to about 150° C., preferably from about 75° C. to about 150° C. and more preferably from about 90° C. to about 105° C.

In one embodiment, the pigment dispersing agent is a polyester. In this case the preferred aromatic component is a dibasic acid and the flexible spacer is an aliphatic polyol. Polyester type dispersing agents may be produced by standard polyester manufacturing processes which are well known in the art. The process of producing polyesters involves the known initial steps of esterification of at least one dibasic acid with at least one polyol, followed by polycondensation which is conducted until the polyester is formed which has the desired viscosity and/or melting point. Suitable polyesters may be produced by condensing an aromatic dibasic acid (including anhydrides and acid esters), such as a dicarboxylic acid or a lower alkyl ester thereof with a polyol such as a glycol. The diacid should be an aromatic, low molecular weight mono- or di-cyclic dibasic acid. Among the dicarboxylic acids and their lower alkyl diesters which may be employed are terephthalic; isophthalic; phthalic; naphthalene dicarboxylic; biphenylene dicarboxylic acid, tetrahydroterephthalic acid, tetrahydroisophthalic acid, tetrahydrophthalic acid, hydronaphthalene dicarboxylic acid, cyclohexanedicarboxylic acid, cyclopentyldicarboxylic acid, cyclooctyldicarboxylic acid, succinic; glutaric acid; sebacic; adipic; azelaic; bibenzoic; pimelic acid, malonic acid, fumaric acid, itaconic acid, their monoesters, their diesters, and mixtures thereof, and bis-p-carboxy-phenoxyethane. Useful naphthalene dicarboxylic acids include the 2,6-, 1,4-, 1,5-, or 2,7-isomers but the 1,2-, 1,3-, 1,6-, 1,7-, 1,8-, 2,3-, 2,4-, 2,5-, and/or 2,8-isomers may also be used; 4,4'-biphenyldicarboxylic acid, 1,4-napthalene dicarboxylate, 1,3-phenylenediacetic acid, 1,2-phenylenediacetic acid, 1,4-phenylenedipropionic acid, 4-carboxyphenoxy acetic acid, 2,3-napthalalenedicarboxlylate, 1,3,5-benzenetricarboxylic acid, tetrafluoroisophthalic acid, tetrafluoroterephthalic acid, tetrafluorophthalic acid, 2-methoxyisophthalic acid, benzylmalonic acid, 4-bromoisophthalic acid, 3-nitrophthalic acid, 4-nitrophthalic acid, 2,6-naphthalene dicarboxylate, 4,4'-oxy-bisbenzoic acid, 1,4-phenylenediacetic acid, diphenic acid, homophthalic acid, 1,2-phenylenedioxodicarboxylic acid, 1,2,4-benzenetricarboxylic acid, 4,4'-hexafluoro (isopropylidine), 3-fluorophthalic acid, 4-methylphthalic acid, 5-tert-butylisophthalic acid, pamoic acid, 4-bromoterephthalic acid, 4,5-dichlorophthalic acid, and 5-octadecyloxyisophthalic acid. Preferred dibasic acids include terephthalic acid, isophthalic acid, naphthalene dicarboxylic acid and mixtures thereof. The dibasic acids may be used in acid form, acid anhydride form or as their esters such as the dimethyl esters.

One or more of these acids and/or their lower alkyl esters is reacted with at least one di- or tri-functional aliphatic organic polyol compound having at least 2 carbon atoms wherein each functionality is selected from the group consisting of alcohols and amines. Preferred are polyols, which include glycols having from about 2 to about 50 carbon atoms, preferably from about 3 to about 10 carbon atoms and include ethylene glycol propylene glycol, butylene glycol, 1,3-propanediol, 1,3-butanediol, 1,4-butanediol, dipropylene glycol, 1,5 pentanediol, 1,6-hexanediol, diethylene glycol, 1,4-cyclohexanediol, 1,4-cyclohexanedimethanol, neopentyl glycol; 1,8-octanediol, 1,10-decanediol, 1,12-dodecanediol, diethylene glycol, triethylene glycol, tetraethylene glycol, dihydroxy-terminated higher oligomers of ethylene glycol, dimer of trimethylene glycol, trimer of trimethylene glycol, dimer of tetramethylene glycol, trimer of tetramethylene glycol, dihydroxy-terminated higher oligomers of tetramethylene glycol, polyethylene glycol, pentaerythritol, glycerol, 1,6-hexamethylene diol, 1,8- octamethylene diol, 1,4-cyclohexanedimethanol and mixtures thereof. Preferred glycols include ethylene glycol, 1,4-cyclohexane dimethanol diethylene glycol and mixtures thereof. The 1,4-cyclohexanedimethanol may be in the cis or the trans form or as cis/trans mixtures. Since one or more esters may be reacted with one or more glycols, the polyesters are not limited to homopolyesters but also include mixed polyesters such as copolyesters as well as copolymers with other monomers. Preferred difunctional or trifunctional aliphatic compounds are glycols having at least four carbon atoms and preferably having from about 6 to about 12 carbon atoms. Such may have additional functionalities such as acids and compounds having a mixture of at least two of these functionalities.

The polyol component adds flexibility to the reaction product with the aromatic diacid component. In the preferred embodiment, the mole ratio of the aromatic diacid to flexible polyol ranges from about 1:1 to about 1:4, preferably from about 1:1 to about 1:3. The selection of pigment dispersing agent including aromatic and aliphatic components, viscosity and melting point will depend on the preferences of the skilled artisan. Desired properties for a particular application can easily be determined.

Optionally, the polyester may be a terpolymer or tetramer containing an additional modifying component such as a di-, tri- or tetra-functional aromatic or aliphatic moiety wherein each functionality is selected from the group consisting of an acid, alcohol, amine, anhydride, ester, acid halide and compatible mixed functionalities thereof. One particularly preferred polyester is a terpolymer of terephthalic acid, adipic acid and 1,6-hexanediol wherein the molar ratio of terephthalic acid to adipic acid to 1,6-hexanediol ranges from about 0.5:1.9:2.6 to about 1.5:0.9:2.6.

Polyethylene terephthalate may be formed from a polymer produced by the polymerization of bis-(2-hydroxyethyl) terephthalate which is itself formed as an intermediate by one of two different methods. One method for producing bis-(2-hydroxyethyl)terephthalate is by direct esterification of terephthalic acid with ethylene glycol as described in U.S. Pat. No. 3,050,533 which is incorporated herein by reference. In this method the by-product of the reaction is water which is distilled from the reaction product. A second method for producing bis-(2-hydroxyethyl)terephthalate is by transesterification of the dialkyl ester of terephthalic acid, preferably dimethyl terephthalate, with ethylene glycol. Preferably, two molecular proportions of ethylene glycol react with one molecular proportion of the dialkyl terephthalate. More preferably, more than two molecular proportions of ethylene glycol per molecular proportion of the dialkyl terephthalate are used since under these conditions the initial transesterification reaction occurs more rapidly and completely. The transesterification reaction is conducted under conditions of elevated temperature. For example, a temperature in the range of from about the boiling temperature of the reaction mixture to as high as 250° C. may be used. The reaction can occur at atmospheric, sub-atmospheric or super-atmospheric pressure. A by-product of the transesterification reaction is an alkanol. For example, if dimethyl terephthalate is used, methanol is produced. The alkanol is then removed from the reaction product. Polyesters produced from the above starting materials may be produced similarly under conventional conditions well known to the skilled artisan. Conventional processes for the preparation of polyesters may also be found in U.S. Pat. Nos. 4,568,720 and 5,552,512 which are incorporated herein by reference. Some of the above polyesters are commercially available and the others can be easily prepared by those skilled in the art using similar, usual means.

In order to increase the reaction rate, the catalysts are added to the transesterification/condensation reaction. Useful catalysts include antimony trioxide/calcium acetate combinations, antimony acetate and organic tin compounds such as Fascat® 4100 catalyst which is available commercially from M&T Chemicals. After the intermediate bis-(2-hydroxyethyl)terephthalate has been produced, it may be converted to polyethylene terephthalate by heating at a temperature above the boiling point of the glycol or the reaction mixture under conditions effecting the removal of the glycol or water. The heating may occur at a temperature as high as 325° C., if desired. During heating, pressure is reduced so as to provide rapid distillation of the excess glycol or water.

In another embodiment, the pigment dispersing agent is a polyamide. In this case the aromatic component is a dibasic acid or acid chloride and the flexible spacer is an aliphatic diamine. Polyamide type dispersing agents may be produced by standard polyamide manufacturing processes which are well known in the art. The process of producing polyamides involves the known steps of reacting at least one aromatic dibasic acid or acid chloride with at least one aliphatic diamine. Suitable polyamide type dispersing agents according to the invention include aliphatic/aromatic polyamides which meet the viscosity and/or melting point criteria mentioned above.

Exemplary aromatic dibasic acids nonexclusively include those listed above as useful for preparing polyesters. Exemplary aliphatic diamines include diamines having from about 2 to about 50 carbon atoms, preferably from about 4 to about 12 carbon atoms and include ethylene diamine, propylene diamine, butylene diamine, dipropylene diamine, diethylene diamine, neopentyl diamine; diethylene diamine, triethylene diamine, tetraethylene diamine, diamine terminated higher oligomers of ethylene diamine, dimer of trimethylene diamine, trimer of trimethylene diamine, dimer of tetramethylene diamine, trimer of tetramethylene diamine, diamine terminated higher oligomers of tetramethylene diamine, polyethylene diamine and mixtures thereof. Since one or more acids may be reacted with one or more diamines, the polyamides are not limited to homopolyamides but also includes mixed polyamides such as copolyamides, for example one formed by reacting adipic acid, terephthalic acid and hexamethylenediamine. Also included are copolymers with other monomers such as copolymers with hexanediol to form a mixed ester/amide. Preferred diamines are difunctional or trifunctional aliphatic compound having at least four carbon atoms and preferably having from about 4 to about 12 carbon atoms. Such may have additional functionalities such as acids, esters and alcohols and compounds having a mixture of at least two of these functionalities. The diamine component adds flexibility to the reaction product with the aromatic diacid component. In the preferred embodiment, the mole ratio of the aromatic diacid to flexible diamine ranges from about 1:1 to about 1:4, preferably from about 1:1 to about 1:3. The selection of pigment dispersing agent including aromatic and aliphatic components, viscosity and melting point will depend on the preferences of the skilled artisan. The most desirable properties for a particular application can easily be determined. Optionally, the polyamide may be a terpolymer or tetramer containing an additional modifying component such as a di-, tri- or tetra-functional aromatic or aliphatic moiety wherein each functionality is selected from the group consisting of an acid, alcohol, amine, anhydride, ester, acid halide and compatible mixed functionalities thereof. Examples include a trimer of terephthalic acid, adipic acid and hexamethylenediamine and a tetramer of of terephthalic acid, adipic acid, hexamethylenediamine and pentanediamine.

The polyamide dispersing agents according to the invention may be produced by procedures for the synthesis of condensation polymers as are described in *Preparative Methods of Polymer Chemistry,* Sorensom W. R., Campbell T. W., Interscience, New York 1968, *Contemporary Polymer Chemistry,* Allcock, H. R., Lampe F. W., Prentice Hall, New Jersey, 1990, and references cited therein.

The invention provides a pigment/dispersing agent composition which is a mixture, preferably a preformed, intimate mixture of at least one pigment, and at least one polyester or polyamide pigment dispersing agent as described above. The pigments may be organic or inorganic. The median diameter is generally less than 1 micrometer. Nonexclusive examples of colorants usable in the present invention are Permanent Yellow G (C.I. 21095), Permanent Yellow GR (C.I. 21100), Permanent Yellow DHG (C.I. 21090), Permanent Rubine L6B (C.I. 15850:1), Permanent Pink F3B (C.I. 12433), Hostaperm Pink E (73915), Hostaperm Red Violet ER (C.I. 46500), Permanent Carmine FBB (12485), Hostaperm Blue B2G (C.I. 74160), Hostaperm Blue A2R (C.I. 74160), and Printex 25.

The amount of pigment in the pigment/dispersing agent composition is preferably from about 5% to about 80%, more preferably from about 10% to about 70% and most preferably from about 20% to about 65% by weight of the pigment/dispersing agent composition. The amount of dispersing agent in the pigment/dispersing agent composition is preferably from about 20% to about 95%, more preferably from about 30% to about 90% and most preferably from about 35% to about 80% by weight of the pigment/dispersing agent composition.

The pigment/dispersing agent compositions of the invention find use in the preparation of colored polymer compositions with high molecular weight host polymers. Host polymer include polyesters, polycarbonates, polyamides and styrenics. When the pigment dispersing agent is a polyester, the host polymer is not a polyester and wherein when the pigment dispersing agent is a polyamide, the host polymer is not a polyamide.

Suitable host polymers include polyesters such as poly(ethylene terephthalate), poly(ethylene naphthalenedicarboxylate), poly(ethylene isophthalate), copolyesters and blends thereof.

Suitable polyamide host polymers include poly(hexamethylene adipamide) (nylon 6,6), poly(hexamethylene sebacamide) (nylon 6,10), poly(heptamethylene pimelamide) (nylon 7,7), poly(octamethylene suberamide) (nylon 8,8), poly(hexamethylene azelamide) (nylon 6,9), poly(nonamethylene azelamide) (nylon 9,9), poly(decamethylene azelamide) (nylon 10,9), poly(4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), as well as nylon 46, nylon 66 and nylon 69 and the like. Blends of two or more aliphatic polyamides may also be employed.

Suitable polycarbonates host polymers include bisphenol A type polycarbonates. Suitable styrenic host polymers include polystyrene homopolymers and styrene containing copolymers such as acrylonitrile-butadiene-styrene copolymers, styrene-acrylonitrile copolymers, and mixtures thereof.

The host polymer is preferably present in the colored polymer composition in an amount of from about 40% to about 99%, more preferably from about 60% to about 99% and most preferably from about 90% to about 99% by weight of the colored polymer composition.

The pigment/dispersing agent composition is preferably present in the colored polymer composition in an amount of from about 1% to about 60%, more preferably from about 1% to about 40% and most preferably from about 1% to about 10% by weight of the colored polymer composition.

By using a certain molar ratio of the dispersing agent precursors, the compatibility of the dispersing agent composition can be tailored to the host polymer. The characteristics of the dispersing agent, such as, melting point and viscosity can be made to fit specific host polymer processing characteristics. The melting point and viscosity are adjusted by controlling the ratio of rigid to flexible components in the composition and the viscosity is controlled by adjusting the degree of polycondensation that occurs in the manufacture or alternatively by the addition of end capping agents such as monofunctional alcohols or amines. Flexibility is related to the number of atoms in an aliphatic chain and is best measured by number of degrees of freedom available to the molecule. Alternatively this can be measured by the number of confirmations that a moiety can form in a standard molecular dynamics calculation. Rigidity is related to the size of the aromatic spacers and is also related to the lack of conformational degrees of freedom available to these moieties. The concepts of rigidity and flexibility are well known to one skilled in the art. Those skilled in the art would consider the similarity of such factors as melting point, viscosity, aromatic fraction and polar group content of the dispersing agent and host polymer in order to determine a compatible dispersing agent for a particular host polymer. Compatibility can be determined by routine experimentation.

The pigment/dispersing agent composition as well as the colored polymer composition may be formed by mixing and heating the components. The mixing and heating may be conducted in an extruder, such as single screw, twin screw and multiple screw extruders, extruder-compounder combinations, compounder-internal mixers, kneader-internal mixers, planetary mixers, Banbury batch mixers, high intensity mixers, two roll mills, injection molders with mixing screws, motionless mixers, ribbon and V-blenders, three roll mills, colloid mills, high speed mixers and ball mills.

The invention also provides a method of forming a colored composition. An aqueous pigment dispersion or an aqueous wet pigment cake is flushed or contacted with at least one liquid polyester or polyamide pigment dispersing agent. The pigment dispersing agent has a Brookfield viscosity of from about 2,000 cps to about 500,000 cps at 140° C., and a melting temperature of up to about 150° C. The pigment dispersing agent displaces water from the aqueous pigment dispersion and forms an intimate mixture of the pigment and the pigment dispersing agent. Thereafter water is removed such as by decanting, heating or establishment of a vacuum. Thereafter the mixture is melt blended with at least one host polymer as above. Usually the contacting is done at a temperature of from about 75° C. to about 150° C.

In another embodiment of the invention, a colored polymer composition may be formed by mixing at least one pigment and at least one polyester or polyamide pigment dispersing agent as above and heating to at least the melting temperature of the pigment dispersing agent. After cooling and forming the mixture into pellets or granules the pellets or granules are blended with at least one host polymer as above.

In another embodiment of the invention a colored polymer composition is formed by mixing at least one pigment; at least one polyester or polyamide pigment dispersing agent as above and at least one host polymer as above. For this use, the melting temperature of the host polymer should be at least about 10° C. higher than the melting temperature of the pigment dispersing agent. Preferably the melting temperature of the host polymer is from about 20° C. to about 250° C. higher than the melting temperature of the pigment dispersing agent. The mixture is then heated to at least the melting temperature of the pigment dispersing agent but below the melting temperature of the host polymer until the pigment and the pigment dispersing agent are intimately combined. Thereafter one mixes and heats the latter mixture to at least the melting temperature of the host polymer to thereby form an intimately mixed, colored polymer composition. Preferably the pigment, pigment dispersing agent and host polymer are dry mixed. Preferably the heating and mixing are done in a single or twin screw extruder.

The following non-limiting examples serve to illustrate the invention. It will be appreciated that variations in proportions and alternatives in elements of the components of the composition will be apparent to those skilled in the art and are within the scope of the present invention.

EXAMPLE 1

To a reactor equipped with an agitator, thermometer and water take-off distillation system are charged 8.52 kg adipic acid, 13.57 kg terephthalic acid 17.91 kg 1,6 hexanediol and 0.08 kg Fascat® 4100 organic tin catalyst. The charge is heated slowly to a temperature of 130–150° C. at which point agitation is commenced and the reaction starts as shown by the appearance of water vapor. Heating is continued until the reaction mass reaches a temperature of 210–220° C. At this point, and on an hourly basis thereafter samples for determining the acid number are taken. When the acid number reaches a value of about 5 (ma KOH/g) the reaction may be terminated and the product can be discharged. Optionally, if higher molecular weight products are desired, heating can be continued to extend the polycondensation reaction. Generally, molecular weights in excess of 20,000 may be undesirable. Such high viscosity products are less effective in the flushing stage of the overall application. The general physical properties of the polyester prepared in the above example are:
Melting Point 95–105° C.
Acid # 5 (mg KOH/g) or less
Brookfield Viscosity 2000–6000 cps @ 140° C.
Molecular Weight 3000–5000

EXAMPLE 2

Approximately 5 kg. of the low molecular weight polyester prepared via the Example 1 and 5 kg. (dry based) of a wet pigment, phthalo-blue are placed into a high intensity Baker-Perkins mixer. The mixing chamber impeller is then started and heated to approximately 100° C. Water from the wet pigment is first decanted and then simply evaporated. When most of the water has evaporated, the pigment and polyester form a homogeneous mixture that can be discharged and cooled. The product is now ground to a suitable size to be compatible with polystyrene and the extruder.

EXAMPLE 3

Approximately 5 kg. of the flushed and ground pigment as prepared in Example 2 are preblended with approximately 5 kg. of virgin polystyrene and then extruded using a conventional single or twin screw extruder. The extrudate is formed into multiple strands which are quenched in water and then pelletized. The strands are smooth and flexible with little tendency for break-out. The pelletized product cuts easily and has a highly uniform appearance.

EXAMPLE 4

A low molecular weight polyamide is produced according to the procedures for the synthesis of condensation polymers as described in *Preparative Methods of Polymer Chemistry,* Sorensom W. R., Campbell T. W., Interscience, New York 1968, *Contemporary Polymer Chemistry,* Allcock, H. R., Lampe F. W., Prentice Hall, New Jersey, 1990.

EXAMPLE 5

Approximately 5 kg. of the low molecular weight polyamide prepared via the Example 4 and 5 kg. (dry based) of a wet pigment, phthalo-blue are placed into a high intensity Baker-Perkins mixer. The mixing chamber impeller is then started and heated to approximately 100° C. Water from the wet pigment is first decanted and then simply evaporated. When most of the water has evaporated, the pigment and polyester form a homogeneous mixture that can be discharged and cooled. The product is now ground to a suitable size to be compatible with polystyrene and the extruder.

EXAMPLE 6

Approximately 5 kg. of the flushed and ground pigment as prepared in Example 5 are preblended with approximately 5 kg. of virgin polystyrene and then extruded using a conventional single or twin screw extruder. The extrudate is formed into multiple strands which are quenched in water and then pelletized. The strands are smooth and flexible with little tendency for break-out. The pelletized product cuts easily and has a highly uniform appearance.

The process of flushing wet pigments and making pigment color concentrates avoids the extreme bother of handling dry pigments in a final manufacturing step where contamination cannot be tolerated. The products of the invention are highly effective in particularly processing pigment/color concentrates for polymer such as polystyrene and styrene copolymers. This performance was unexpected as polar polymers such as the polyester generally show little or poor compatibility with polymers having a large aromatic character.

What is claimed is:

1. A composition comprising
   a) a solid mixture of at least one pigment, and at least one pigment dispersing agent comprising a polyester or polyamide, wherein the pigment dispersing agent is the reaction product of at least one mono- or di-cyclic aromatic diacid and at least one di- or tri-functional aliphatic organic compound having at least 2 carbon atoms wherein each functionality is selected from the group consisting of alcohols and amines, which pigment dispersing agent has a Brookfield viscosity of from about 2,000 cps to about 500,000 cps at 140° C., and a melting temperature of up to about 150° C., and
   b) at least one host polymer selected from the group consisting of polyesters, polycarbonates, polyamides, polystyrene homopolymers, styrene containing copolymers, and mixtures thereof; and
wherein when the pigment dispersing agent is a polyester, the host polymer is not a polyester and wherein when the pigment dispersing agent is a polyamide, the host polymer is not a polyamide.

2. The composition of claim 1 wherein the pigment dispersing agent is the reaction product of at least one mono- or di-cyclic aromatic diacid and at least one di- or tri-functional aliphatic organic compound having at least 4 carbon atoms wherein each functionality is selected from the group consisting of alcohols and amines.

3. The composition of claim 1 wherein the mole ratio of the aromatic diacid to di- or tri-functional aliphatic organic compound ranges from about 1:1 to about 1:4.

4. The composition of claim 1 wherein the aliphatic organic compound has from about 6 to about 12 carbon atoms.

5. The composition of claim 1 wherein the pigment dispersing agent is the reaction product of at least one mono- or di-cyclic aromatic diacid; at least one di- or tri-functional aliphatic organic compound having at least 2 carbon atoms wherein each functionality is selected from the group consisting of alcohols and amines; and at least one di-, tri- or tetra-functional aromatic or aliphatic compound wherein each functionality is selected from the group consisting of an acid, alcohol, amine, anhydride, ester, acid halide and combinations thereof.

6. The composition of claim 1 wherein the pigment dispersing agent comprises a polyester.

7. The composition of claim 1 wherein the pigment dispersing agent is polyethylene terephthalate or a terpolymer of terephthalic acid, adipic acid and 1,6-hexanediol.

8. The composition of claim 7 wherein the molar ratio of terephthalic acid to adipic acid to 1,6-hexanediol ranges from about 0.5:1.9:2.6 to about 1.5:0.9:2.6.

9. The composition of claim 1 wherein the pigment dispersing agent is the reaction product of a component selected from the group consisting of terephthalic acid, isophthalic acid, adipic acid, phthalic acid, phthalic anhydride, phthalic acid ester, azelaic acid, sebacic acid and mixtures thereof with ethylene glycol, propylene glycol, butylene glycol, polyethylene glycol or mixtures thereof.

10. The composition of claim 1 wherein the mixture has a melting temperature of from about 75° C. to about 150° C.

11. A method of forming a colored composition which comprises
(a) contacting an aqueous pigment dispersion or an aqueous wet pigment cake with at least one pigment dispersing agent comprising a polyester or polyamide, wherein the pigment dispersing agent is the reaction product of at least one mono- or di-cyclic aromatic diacid and at least one di- or tri-functional aliphatic organic compound having at least 2 carbon atoms wherein each functionality is selected from the group consisting of alcohols and amines, which pigment dispersing agent has a Brookfield viscosity of from about 2,000 cps to about 500,000 cps at 140° C., and a melting temperature of up to about 150° C., under conditions sufficient to displace water from the aqueous pigment dispersion and form an intimate solid mixture of the pigment and the pigment dispersing agent;
(b) removing the displaced water;
(c) thereafter melt blending the mixture with at least one host polymer selected from the group consisting of polyesters, polycarbonates, polyamides, polystyrene homopolymers, styrene containing copolymers, and mixtures thereof; and
wherein when the pigment dispersing agent is a polyester, the host polymer is not a polyester and wherein when the pigment dispersing agent is a polyamide, the host polymer is not a polyamide.

12. The method of claim 11 wherein the contacting is done at a temperature of from about 75° C. to about 150° C.

13. The method of claim 11 wherein the pigment dispersing agent is the reaction product of at least one mono- or di-cyclic aromatic diacid and at least one di- or tri-functional aliphatic organic compound having at least 4 carbon atoms wherein each functionality is selected from the group consisting of alcohols and amines.

14. The method of claim 11 wherein the pigment dispersing agent is the reaction product of at least one mono- or di-cyclic aromatic diacid; at least one di- or tri-functional aliphatic organic compound having at least 4 carbon atoms wherein each functionality is selected from the group consisting of alcohols and amines; and at least one di-, tri- or tetra-functional aromatic or aromatic compound wherein each functionality is selected from the group consisting of an acid, alcohol, amine, anhydride, ester, acid halide and combinations thereof.

15. The method of claim 11 wherein the pigment dispersing agent is polyethylene terephthalate or a terpolymer of terephthalic acid, adipic acid and 1,6-hexanediol.

16. A method of forming a colored polymer composition which comprises
(a) mixing at least one pigment and at least one pigment dispersing agent comprising a polyester or polyamide, wherein the pigment dispersing agent is the reaction product of at least one mono- or di-cyclic aromatic diacid and at least one di- or tri-functional aliphatic organic compound having at least 2 carbon atoms wherein each functionality is selected from the group consisting of alcohols and amines, and heating to at least the melting temperature of the pigment dispersing agent;
(b) cooling the result from step (a) to form a solid mixture;
(c) blending the resulting solid mixture from step (b) with at least one host polymer selected from the group consisting of polyesters, polycarbonates, polyamides, polystyrene homopolymers, styrene containing copolymers, and mixtures thereof, wherein when the pigment dispersing agent is a polyester, the host polymer is not a polyester and wherein when the pigment dispersing agent is a polyamide, the host polymer is not a polyamide; and heating to at least the melting temperature of the host polymer to thereby form a colored polymer composition.

17. The method of claim 16 wherein step (b) further comprises forming the mixture into pellets or granules.

18. The method of claim 16 wherein the pigment dispersing agent is polyethylene terephthalate or a terpolymer of terephthalic acid, adipic acid and 1,6-hexanediol.

19. The method of claim 16 wherein the pigment dispersing agent is the reaction product of at least one mono- or di-cyclic aromatic diacid and at least one di- or tri-functional aliphatic organic compound having at least 4 carbon atoms wherein each functionality is selected from the group consisting of alcohols and amines.

20. The method of claim 16 wherein the pigment dispersing agent is the reaction product of at least one mono- or di-cyclic aromatic diacid; at least one di- or tri-functional aliphatic organic compound having at least 4 carbon atoms wherein each functionality is selected from the group consisting of alcohols and amines; and at least one di-, tri- or tetra-functional aromatic or aliphatic compound wherein each functionality is selected from the group consisting of an acid, alcohol, amine, anhydride, ester, acid halide and combinations thereof.

21. A method of forming a colored polymer composition which comprises
(a) mixing at least one pigment; at least one solid pigment dispersing agent comprising a polyester or polyamide to form a solid mixture, wherein the pigment dispersing agent is the reaction product of at least one mono- or di-cyclic aromatic diacid and at least one di- or tri-functional aliphatic organic compound having at least 2 carbon atoms wherein each functionality is selected from the group consisting of alcohols and amines; and at least one host polymer selected from the group consisting of polyesters, polycarbonates, polyamides polystyrene homopolymers, styrene containing copolymers, and mixtures thereof; wherein the melting temperature of the host polymer is at least about 10° C. higher than the melting temperature of the pigment dispersing agent and wherein when the pigment dispersing agent is a polyester, the host polymer is not a polyester and wherein when the pigment dispersing agent is a polyamide, the host polymer is not a polyamide;

(b) mixing and heating the resulting mixture from step (a) to at least the melting temperature of the pigment dispersing agent but below the melting temperature of the host polymer until the pigment and the pigment dispersing agent are intimately combined; and thereafter (c) mixing and heating the resulting mixture from step (b) to at least the melting temperature of the host polymer to thereby form an intimately mixed, colored polymer composition.

22. The method of claim 21 wherein the pigment dispersing agent is polyethylene terephthalate or a terpolymer of terephthalic acid, adipic acid and 1,6-hexanediol.

23. The method of claim 21 wherein the pigment dispersing agent is the reaction product of at least one mono- or di-cyclic aromatic diacid and at least one di- or tri-functional aliphatic organic compound having at least 4 carbon atoms wherein each functionality is selected from the group consisting of alcohols and amines.

24. The method of claim 21 wherein the pigment dispersing agent is the reaction product of at least one mono- or di-cyclic aromatic diacid; at least one di- or tri-functional aliphatic organic compound having at least 2 carbon atoms wherein each functionality is selected from the group consisting of alcohols and amines; and at least one di-, tri- or tetra-functional aromatic or aliphatic compound wherein each functionality is selected from the group consisting of an acid, alcohol, amine, anhydride, ester, acid halide and combinations thereof.

25. The method of claim 21 wherein the pigment, pigment dispersing agent and host polymer are dry mixed in step (a).

26. The method of claim 21 wherein the melting temperature of the host polymer is from about 20° C. to about 250° C. higher than the melting temperature of the pigment dispersing agent.

27. The method of claim 21 wherein steps (b) and (c) are done in a single or twin screw extruder.

* * * * *